United States Patent [19]
Brooks

[11] Patent Number: 5,098,940
[45] Date of Patent: Mar. 24, 1992

[54] CRYSTALLINE POLYPHTHALAMIDE COMPOSITION HAVING IMPROVED PROPERTIES

[75] Inventor: Gary T. Brooks, Naperville, Ill.

[73] Assignee: Amoco Corporation, Chicago, Ill.

[21] Appl. No.: 496,944

[22] Filed: Mar. 21, 1990

Related U.S. Application Data

[63] Continuation-in-part of Ser. No. 344,656, Apr. 27, 1989, abandoned.

[51] Int. Cl.⁵ .............................................. C08L 77/10
[52] U.S. Cl. ................................. 524/227; 524/398; 524/538; 525/420; 525/450
[58] Field of Search .................. 525/425, 420, 450; 524/538, 227

[56] References Cited

U.S. PATENT DOCUMENTS

| | | | |
|---|---|---|---|
| 4,386,175 | 5/1983 | Cogswell et al. | 525/425 |
| 4,439,578 | 3/1984 | Kim et al. | 525/432 |
| 4,442,057 | 4/1984 | Brody | 525/425 |
| 4,567,227 | 10/1986 | Kiss | 525/425 |
| 4,611,025 | 9/1986 | Akkapeddi et al. | 524/451 |
| 4,728,698 | 3/1988 | Isayev et al. | 525/425 |
| 4,792,587 | 12/1988 | Kanoe et al. | 525/425 |
| 4,833,229 | 3/1989 | Magagnini et al. | 525/425 |
| 4,879,354 | 11/1989 | Harris et al. | 525/425 |

FOREIGN PATENT DOCUMENTS

| | | |
|---|---|---|
| 122688 | 10/1984 | European Pat. Off. |
| 3216413 | 11/1983 | Fed. Rep. of Germany ...... 525/425 |
| 109551 | 5/1977 | Japan . |
| 252657 | 10/1989 | Japan ................................ 525/425 |

OTHER PUBLICATIONS

G. Kiss, Polym. Eng. and Sci. 27(6) 414–423 (1987).
A. Siegmann et al., Polymer 26, 1325–1330 (1985).

*Primary Examiner*—Joseph L. Schofer
*Assistant Examiner*—M. Nagumo
*Attorney, Agent, or Firm*—Frederick S. Jerome; William H. Magidson; Ralph C. Medhurst

[57] ABSTRACT

Improved polyphthalamide compositions which possess desirable heat resistance properties comprise a crystalline polyphthalamide component and a particulate thermotropic liquid crystalline polymer component in an amount sufficient to nucleate a melt of the polyphthalamide. Molded articles prepared from these compositions exhibit excellent mechanical and thermal properties, including expecially high crystalline uniformity throughout even when molded using molds heated below Tg of the polyphthalamide component, often facilitating molding using steam or hot water-heated molds.

22 Claims, No Drawings

CRYSTALLINE POLYPHTHALAMIDE COMPOSITION HAVING IMPROVED PROPERTIES

This application is a continuation-in-part of U.S. application Ser. No. 344,656 filed Apr. 27, 1989, now abandoned for CRYSTALLINE POLYPHTHALAMIDE COMPOSITION HAVING IMPROVED HEAT RESISTANCE PROPERTIES.

BACKGROUND OF THE INVENTION

This invention relates to thermoplastic compositions which possess desirable heat resistance properties particularly, this invention relates to a melt-processable composition containing a crystalline polyphthalamide component and a particulate thermotropic liquid crystalline polymer component in an amount sufficient to nucleate a melt of the polyphthalamide, with or without reinforcing fibers, and to methods of improving the molding performance of polyphthalamide and fiber reinforced polyphthalamide compositions while maintaining the mechanical and thermal properties of the polyphthalamide or fiber-filled polyphthalamide compositions Molded articles prepared from these compositions exhibit excellent mechanical and thermal properties, including an especially high degree of crystalline homogeneity and high heat deflection temperature, even when molded using molds heated to temperatures below the glass transition temperature of the polyphthalamide component, often facilitating molding using steam or hot water-heated molds.

Commonly assigned U.S. Pat. No. 4,603,166 to Poppe et al., issued July 29, 1986, discloses polyphthalamide compositions which, when filled with glass fibers and molded, have heat deflection temperatures at 264 psi, determined according to ASTM D-648, above about 245° C. (473° F.). Included are compositions comprising recurring terephthalamide and adipamide or terephthalamide, isophthalamide and adipamide units and, preferably, wherein the mole ratio of dicarboxylic acid moieties provided by the terephthalamide, isophthalamide and adipamide units is about 65-90:25-0:35-5, respectively. As disclosed therein, such compositions, including particulate- and fiber-filled compositions, exhibit desirable thermal properties including deflection temperature, high tensile strength and flexural modulus and are useful in various applications including preparation of molded articles, fibers, and laminates.

Commonly assigned U.S. Pat. No. 4,617,342 to Poppe et al., issued Oct. 14, 1986, and commonly assigned, copending application Ser. No. 142,469 filed Jan. 8, 1988, and published European Patent Application No. 84300745 1 (Publication No. 0122688), published Oct. 24, 1984, disclose polyphthalamides which, when filled with glass fibers, have heat deflection temperatures at 264 psi, determined according to ASTM D-648, above 240° C. Compositions according to U.S. Pat. No. 4,617,342 are prepared from dicarboxylic acid compounds comprising terephthalic acid and isophthalic acid compounds in a mole ratio of 80:20 to about 99:1 and diamines comprising hexamethylene diamine and trimethylhexamethylene diamine in a mole ratio of about 98:2 to about 60:40. Compositions taught in application Ser. No. 142,469 are based on terephthalic acid and isophthalic acid compounds in a mole ratio of about 70:30 to about 99:1 and hexamethylene diamine. Such compositions have utility in various applications, the neat and fiber-filled compositions being particularly suited for molding applications.

While such polyphthalamides filled with reinforcing fibers can be injection molded into articles having desirable mechanical and thermal properties, injection molding conditions for many of the polyphthalamides, and particularly those having a relatively high content of terephthalamide units (e.g., greater than about 50 mole percent) are often more severe than in the case of lower melting point polyamides such as poly(hexamethylene adipamide). Attainment of optimum properties in such polyphthalamide molded articles also can be complicated by molding conditions required to develop sufficient crystallinity in the molded polyphthalamides to achieve significant increases in heat deflection temperature and other properties dependent on crystallinity. In particular, the polyphthalamides have glass transition temperatures ("Tg") enerally ranging up to about 135° C.; however conventional steam or hot water heated molds, which typically can reach temperatures up to about 100° C., may be inadequate to allow for consistent development of sufficient crystallinity in many of the polyphthalamides to obtain significant property appreciation or may require undesirably long molding cycle times and higher mold temperatures to do so. Of course, higher mold temperatures can be achieved with oil heated molds which can result in longer molding cycle times or annealing of molded articles can be conducted to increase crystallization and thereby enhance properties dependent thereon; however, both of these alternatives add cost and complexity to a molding operation. Accordingly, it will be appreciated that it would be desirable to modify such polyphthalamides to facilitate consistent attainment of heat deflection temperatures and other desirable properties in molding without sacrificing other desirable properties.

In general, it is known that modification of polymer properties may be accomplished in various ways. Modification of molecular structure through use of additional or different monomers in polymerization can lead to desirable improvements in some properties. However, the same often are accompanied by loss of other desirable properties and use of additional or different monomers is not always practical due to process considerations. In certain of the above-described polyphthalamides, replacement of terephthalamide units with adipamide units is effective to lower Tg of the compositions, thereby facilitating molding at lower mold temperatures; however, other properties, such as resistance to water absorption and thermal degradation are sacrificed. Use of additives may lead to property improvements without complicating a polymerization process; however the effects of additives often are unpredictable and, again, improvements in some properties often are achieved at the expense of other properties. For example, addition of plasticizers to the above-described polyphthalamides can result in lowering of Tg but this is achieved at the expense of mechanical properties such as modulus. Blending a given polymer with one or more other polymers may give compositions with a combination of properties intermediate those of the individual components; however, processing requirements often limit the number of candidates that can be blended with a given polymer in an attempt to attain desirable property modifications. Also, blending often is unpredictable; properties of a blend may reflect a desirable balance of the properties of its components or they may be better or worse than those of the components depending on compatibility of the components, reactivity thereof under blending or processing conditions and other factors.

The aforementioned U.S. Pat. No. 4,603,166 and U.S. Pat. No. 4,617,342 disclose that the polyphthalamides taught therein can contain fillers including minerals and fibers, preferably at levels of about 10-60 weight percent, for extending or providing reinforcement to the polyphthalamides. Disclosed particulate fillers include glass beads or glass spheres ranging from 5 microns to 50 microns in diameter, and fibrous mineral filler, such as, Wollastokup and Franklin Fiber with thickness, on average, between 3 microns and 30 microns. As can be seen from Example X of U.S. Pat. No. 4,603,166, heat deflection temperature of a polyphthalamide composition containing 40 or 60 weight percent of certain of these fillers was at most about 200° C. U.S. Pat. No. 4,603,166 also discloses that the polyphthalamides can contain additives including heat stabilizers, UV stabilizers, toughening agents, flame retardants, plasticizers, antioxidants, and pigments. Example VII of the patent also discloses a nucleated, glass fiber-filled polyphthalamide composition containing 1.5 weight percent sodium phenyl phosphinate as a nucleating agent. The heat deflection temperatures thus obtained were at most about 145° C.

U.S. Pat. No. 3,755,221 to Hitch, issued Aug. 28, 1973, discloses fast-cycling, rapidly moldable poly(hexamethylene adipamide) compositions containing 0.001-0.5 weight percent inert, particulate nucleating agent having average diameter less than 0.5 micron, 0.01-4 weight percent alkylene diamide derived from a $C_{1-16}$ alkylene diamine and a saturated or unsaturated $C_{12-20}$ monocarboxylic acid and 0.01-2 weight percent of a metal salt of a saturated or unsaturated $C_{12-20}$ monocarboxylic acid. According to Hitch, the nucleating agent induces formation and growth of a crystalline texture characterized by reduction in spherulite size and in the degree of supercooling of the molten poly(hexamethylene adipamide) on cooling. It also is said to result in solidification of articles molded from the compositions at higher temperatures than otherwise would be the case, thereby reducing mold closed time and increasing production rates. Suitable nucleating agents are said to be any nucleating agent conventionally used in production of polyamides having a fine crystalline structure; disclosed examples include organic polymers of higher melting point than the polyamide or, preferably, an inorganic material such as talc, molybdenum sulfide, graphite or an alkali- or alkaline earth-metal fluoride, particularly calcium fluoride. The alkylene diamide included in the composites according to Hitch is said to function as a mold release agent; N,N'-ethylene-bis-stearamide is disclosed as a preferred alkylene diamide. The metal carboxylate component of Hitch's compositions is said to function as a lubricant that facilitates flow of the molten poly(hexamethylene adipamide). Zinc stearate is disclosed as a preferred material. Inclusion of up to 60 weight percent reinforcing agents such as glass fibers, by weight of polymer, also is disclosed. While Hitch discloses use of particulates to reduce cycle times in molding poly(hexamethylene adipamide) and glass fiber-filled compositions, the patent does not disclose the polyphthalamide component of the compositions of this invention nor does it address difficulties in molding of polyphthalamides requiring more severe molding conditions than poly(hexamethylene adipamide) The use of talc and the polyphthalamide component of the compositions of this invention is the subject matter of commonly assigned U.S. patent application Ser. No. 342,099 filed Apr. 21, 1989, in the name of David P. Sinclair, herein incorporated by reference.

Various additives have been proposed to crystallizable isotropic thermoplastics such as polyamides which are intended to improve the physical properties of fibers or films found therefrom. Such additives include inorganic materials, small organic compounds and large polymers with which the isotropic thermoplastic is coextruded or otherwise blended. With the discovery of thermotropic polyesters, as described, for example, in U.S. Pat. Nos. 4,140,846 to Jackson, Jr. et al. (Feb. 20, 1979), 3,890,256 to McFarlane et al. (June 17, 1975), 3,991,013 to Pletcher (Nov. 9, 1976), 4,066,620 to Kleinschuster et al. (Jan. 3, 1978), 4,075,262 to Schaefgen (Feb. 21, 1978), 4,118,372 to Schaefgen (Oct. 3, 1978) and 4,156,070 to Jackson, Jr. et al. (May 22, 1979), some proposals have been made to blend these materials with isotropic polymers. Unfortunately, such thermotropic polymers have thus far proved incompatible with isotropic polymers, with the heterogeneous blends that are formed exhibiting properties no better than the isotropic polymers alone.

In particular, M. Takayanagi et al. in J. Macromol. Sci.—Phys., B17(4), pp. 591–615 (1980) report attempts to blend nylon-6 or nylon-66 with wholly aromatic polyamides such as poly-p-benzamide or their block copolymers with nylon-6 or nylon-66. The wholly aromatic polyamides used are infusible.

Within the last two decades, the new class of polymeric materials which are called liquid crystalline polymers ("LCP"s) has been studied extensively. The anisotropic state of their solution (lyotropic liquid crystalline polymers, "LLCP"s) or melt (thermotropic liquid crystalline polymers, "TLCP"s) is between the boundaries of solid crystals and isotropic liquids. Tai-Shung Chung in "The Recent Developments of thermotropic Liquid Crystalline Polymers," Polymer Engineering and Science, July, 1986, Vol. 26, No. 13, pp. 901-919, herein incorporated by reference, describes this class of polymeric materials. TLCPs exhibit an anisotropic liquid state at temperatures in a range from about the melting point to the lower of either the clearing temperature or the decomposition temperature of the TLCP. This polymeric state is also referred to as a mesomorphic structure or a mesophase—a combined term adopted from the Greek language ("mesos" meaning "intermediate," and "morphe" meaning "form"). Upon melting a TLCP an anisotropic liquid state or mesophase is formed. It does not meet all the criteria to be a true solid or a true liquid, but it has characteristics similar to those of a solid and a liquid. For instance, the anisotropical optical properties of liquid crystalline polymeric fluids are like those of regular solids, but their molecules are free to move similar to liquids. The main difference between these polymers and the conventional liquid crystals used in electrical display devices is the molecular weight. LCPs have a much higher molecular weight. It is concluded by Chung, that the preparation of LCPs has been well developed by the industry, but that the understanding of the formation of LC domains has not been completely understood. The theoretical explanations for some unexpected results are still not available.

A. Siegmann et al. presented their study of a system composed of an amorphous thermoplastic polyamide matrix (Trogamid-T, Dynamite Nobel, West Germany)

and a TLCP (aromatic copolyester based on 6-hydroxy-2-naphthoic acid and p-hydroxybenzoic acid, Celanese Corp. U.S.A.) in "Polyblends containing a liquid crystalline polymer", Polymer 26 1325 (1985), herein incorporated by reference. The viscosity of the blends was always much lower than that of the parent polymers. However, as is to be expected, the tensile mechanical behavior of these blends was very similar to that of polymeric composites. The rheological measurements were taken at 260° C. (below the LCP melting). Siegmann et al. paper does not disclose the polyphthalamide component of the compositions of this invention.

Various LCPs have been claimed as processing aids for melt processable polymers, including fiber-forming aliphatic and aromatic polyamides, but improvement in processability, e.g., lowering of melt viscosity, is at the expense of a decrease in physical properties. As can be seen from Example 5 of U.S. Pat. No. 4,386,174, to Cogswell et al. issued May 31, 1983, or the same Example 5 of its continuation-in-part, U.S. Pat. No. 4,438,236, issued March 20, 1984, impact strength of a 90 parts nylon 6,6 with 10 parts LCP blend was only ⅓ the impact strength of nylon 6,6 without LCP. U.S. Pat. No. 4,386,174 does not disclose the crystalline polyphthalamide component of the compositions of this invention nor does the patent disclose any polyphthalamide compositions which posses improved heat resistance properties.

In U.S. Pat. No. 4,439,578 to Kim et al. issued Mar. 27, 1984, the inclusion of particulates of LLCPs having a high aspect ratio in thermoplastic molding compositions has been claimed to enhance the ability of the thermoplastic polymer to resist melt dripping in the standard UL94 vertical burn tests with bottom ignition, Gabor D. Kiss disclosed tensile strength and Izod impact are decreased by blending of nylon with either LCP polyester or LCP esteramide (LCP content 30 weight percent) in "In Situ Composites: Blends of Isotropic Polymers and Thermotropic Liquid Crystalline Polymers" Polymer Engineering and Science, Mar., 1987, Vol. 27, No. 6. pp 410–423 at p 414. While Kiss discloses use of fibrous structures formed by thermotropic polymers to reinforce both crystalline and amorphous isotropic polymers, there is no suggestion of any nucleation process. Kiss does not disclose the crystalline polyphthalamide component of the compositions of this invention nor does he suggest any method to obtain polymer compositions which posses improved heat resistance properties.

Other patents and publications that may be of interest in connection with this invention in disclosing various polyamide compositions containing particulate materials are discussed below; none discloses the composition of this invention or suggests that the improvements achieved according to the invention might be achieved.

U.S. Pat. No. 4,292,416 to Shue et al., issued Sept. 29, 1981, while directed to blending of polyarylene sulfides with semicrystalline polyamides or copolyamides to obtain blends of improved molding performance, discloses that polyamides that do not normally contain sufficient crystallinity to attain desirable properties can frequently be improved in those properties through use of nucleating agents. Shue et al. discloses that suitable nucleating agents known in the prior art include finely divided organic or inorganic salts, silica, alumina and boron nitride and that it also is known that other polymers melting above the polyamide melting point can act as nucleating agents for the polyamide.

U.S. Pat. No. 4,501,844 to Chen et al., issued Feb. 26, 1985, and U.S. Pat. No. 4,536,533, also to Chen et al., issued Aug. 20, 1985, are directed to injection moldable, rapidly crystallizable compositions comprising a linear polyamide selected from poly(4,4'-methylenediphenylene azelamide), -sebacimide), -undecanediamide) and -dodecanediamide) and at least one material, selected from talc, sodium benzenesulfonate, polyethylene monomers, methacrylated butadiene-styrene polymers and certain multi-phase composite interpolymers, in an amount sufficient to promote crystallization of the polyamide. The patent notes that the art of increasing crystallization rate of certain polymers using specific nucleators is known but the art of crystallization is empirical and findings with one polymer cannot as a rule be applied to a different polymer. The polyamides used according to Chen et al. are normally amorphous in solid form unless annealed or heat treated. The crystallinity-promoting additive is used in amounts that can be determined by trial and error, according to Chen et al., generally ranging from about 0.1–20 weight percent based on weight of the polyamide and the crystallinity promoting additive. In the case of talc and benzenesulfonate as crystallinity-promoting additives, Chen et al. discloses that crystallinity is initiated at talc levels of about 0.1–5 weight percent and that both materials promote a surprisingly fast rate of crystallization in the polyamides. Compositions containing up to about 55 weight percent of a reinforcing agent or filler also are disclosed by Chen et al., inorganic and organic fibers, including glass and carbon fibers, being mentioned. Use of talc as a filler also is disclosed. Heat deflection temperatures at 264 psi of compositions according to Chen et al. are said to be extremely high, being in excess of 200° C. and in some cases approximately 250° C. Example 3 of the patents illustrates a composition with about 1 weight percent talc and 33 weight percent glass fibers having heat deflection temperature at 264 psi of 247° C. when molded using a 138° C. mold; however, heat deflection temperature at 264 psi of the composition molded using a 99° C. mold was only 131° C.

It is an object of this invention to provide polyphthalamide and/or fiber-filled polyphthalamide compositions of improved melt processibility. A further object of the invention is to provide such filled and/or unfilled compositions capable of being injection molded into articles having desirable mechanical and thermal properties. Another object of the invention is to provide such filled compositions capable of being molded into articles having such properties even when molded using molds heated at below Tg of the polyphthalamide so as to permit use of steam- or hot water-heated molds with a number of such polyphthalamides. Another object of the invention is to provide an improved process for molding such filled polyphthalamide compositions into useful fabricated products. A particular object of the invention is to provide fiber-filled polyphthalamide molding compositions which, when molded using a mold heated to within about 100° C. of Tg of the polyphthalamide, have heat deflection temperatures at 264 psi according to ASTM D-648 substantially equal to those achieved when molded using a mold heated at Tg of the polyphthalamide. Other objects of the invention will be apparent to persons skilled in the art from the following description and claims.

SUMMARY OF THE INVENTION

The general objects of this invention can be attained with resinous compositions comprising an at least partially crystalline polyphthalamide component and a particulate thermotropic liquid crystalline polymer component in an amount sufficient to nucleate a melt of the polyphthalamide.

In another aspect, the invented compositions comprise a polyphthalamide component comprising at least two recurring units selected from the group consisting of terephthalamide units, isophthalamide units and adipamide units and which when filled with 33 weight percent glass fibers, has a heat deflection temperature at 264 psi, according to ASTM D-648, of at least 240° C., and a particulate thermotropic liquid crystalline polymer component in an amount sufficient to nucleate a melt of the polyphthalamide.

Advantageously, the polyphthalamide component has a melting temperature in a range from about the melting temperature of the liquid crystalline polymer to the decomposition temperature of the liquid crystalline polymer.

Unexpectedly, the invented compositions have substantially greater degree of crystalline homogeneity than comparable molded polyphthalamide compositions without a particulate TLCP component. Molded articles prepared from these compositions exhibit excellent mechanical and color properties, including improved dimensional stability and color uniformity. The invented compositions have a whiter, cosmetically more appealing surface than comparable molded polyphthalamide compositions without a particulate TLCP component.

Also, the general objects of this invention can be attained with resinous compositions comprising (a) an at least partially crystalline polyphthalamide component; (b) about 10 to 200 parts by weight reinforcing fibers per one hundred parts by weight of the polyphthalamide component; and (c) a particulate thermotropic liquid crystalline polymer component in an amount sufficient to nucleate a melt of the polyphthalamide.

In another aspect, the invented compositions comprise (a) a polyphthalamide component comprising at least two recurring units selected from the group consisting of terephthalamide units, isophthalamide units and adipamide units and which, when filled with glass fibers, has a heat deflection temperature at 264 psi, according to ASTM D-648, of at least about 240° C.; (b) about 10 to 200 parts by weight reinforcing fibers per one hundred parts by weight of the polyphthalamide component; and (c) a particulate thermotropic liquid crystalline polymer component in an amount sufficient to nucleate a melt of the polyphthalamide.

Unexpectedly, the invented compositions have substantially greater heat deflection temperatures than comparable molded polyphthalamide compositions without a particulate TLCP component. The invented compositions can even have substantially greater heat deflection temperatures than either comparable molded polyphthalamide compositions without a particulate TLCP component or comparable molded TLCP compositions without a polyphthaoamide component. In another aspect, the invented compositions exhibit increases in heat deflection temperature comparable to those achieved with the fiber-filled polyphthalamides without particulate TLCP but at lower mold temperatures. Such improvements are attained using molds heated below Tg of the polyphthalamide component, thereby facilitating use of steam- or hot water-heated molds in molding of some of the polyphthalamides.

DETAILED DESCRIPTION OF THE INVENTION

In greater detail, the polyphthalamide component of the invented compositions suitably comprises at least two recurring units selected from the group consisting of

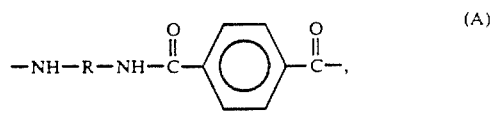

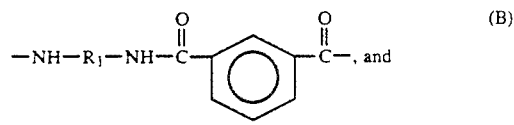

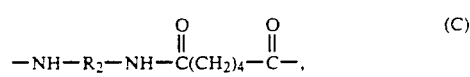

wherein R, $R_1$ and $R_2$ independently comprise a divalent straight chain or cyclic aliphatic radical which is unsubstituted or substituted with up to one methyl group per carbon atom. Such polyphthalamides, preferably, have heat deflection temperatures at 264 psi, according to ASTM D-648, of at least about 240° C. when filled with 33 weight percent glass fibers.

Polyphthalamides useful in the present invention can be characterized as having a fast or intermediate rate of crystallization. For purposes hereof, polyphthalamides are characterized as fast crystallizing if heat deflection temperature at 264 psi according to ASTM D-648 of the polyphthalamide composition filled with 33 weight percent glass fibers and molded using a mold heated above Tg but below the melt crystallization temperature (Tcm) of the polyphthalamide normally is at least about 240° C. and heat deflection temperature at 66 psi, according to ASTM D-648, of the unfilled polyphthalamide molded using a so-heated mold normally is at least about 220° C. Intermediate crystallizing polyphthalamides, for purposes hereof, are characterized by heat deflection temperatures at 264 psi, according to ASTM D-648, normally of at least about 240° C. when so-filled and molded and heat deflection temperatures at 66 psi, according to ASTM D-648, normally below about 220° C. in the case of the so-molded, unfilled compositions. Polyphthalamides with heat deflection temperatures at 264 psi, according to ASTM D-648, normally below about 240° C. when so-filled and injection molded are slow-crystallizing or amorphous polyamides and are not suitable according to this invention because they lack sufficient crystallinity or crystallizability to develop high heat deflection temperatures when filled with reinforcing fibers and molded. Further, the slow crystallizing polyphthalamides can undergo crystallization during use at elevated temperatures of articles fabricated therefrom, resulting in dimensional change and premature failure.

While the polyphthalamide component of the invented compositions is described herein in terms of heat deflection temperature of at least about 240° C. when filled with 33 weight percent glass fibers, it will be understood that such heat deflection temperatures often are also achieved at different fiber levels, the 33 weight percent level being chosen as a convenient reference point. Glass fibers of the type commonly utilized to prepare glass fiber-filled polyamide compositions suitable for injection molding can be used in the determination of heat deflection temperature. Compounding of such glass fibers with the polyphthalamide is conducted so that substantially uniform dispersion of fibers in the polyphthalamide is achieved. It also will be understood that heat deflection temperatures of the 33 weight percent glass fiber-filled polyphthalamide component of the invented compositions can vary with molding conditions, including mold temperature and, to a lesser extent, cycle time, barrel temperature and injection pressure. Accordingly, while the polyphthalamide component of the invented compositions is defined in terms of a heat deflection temperature at 264 psi according to ASTM D-648 in respect of the 33 weight percent glass fiber-filled resin, it will be understood that resins having the specified heat deflection temperatures under appropriate conditions are suitable according to this invention even though molding conditions may be varied to avoid attaining such heat deflection temperatures. As indicated above, heat deflection temperatures of at least about 240° C. normally are attained using a mold heated to above Tg but below Tcm of the polyphthalamide for 33 weight percent glass fiber-filled compositions containing the polyphthalamides suitable according to this invention.

Suitable polyphthalamides according to the invention also include those that have heat deflection temperatures at 264 psi according to ASTM D-648 below about 240° C. in as-molded form but above about 240° C. after annealing of the molded specimen. Suitable glass fibers, compounding and molding conditions for determining heat deflection temperature at 264 psi according to ASTM D-648, are illustrated in the examples appearing hereinbelow.

In the formulas A, B and C depicted hereinabove, R, $R_1$ and $R_2$ can be the same or different and comprise a straight chain or cyclic aliphatic divalent radical which is unsubstituted or substituted with up to one methyl substituent per carbon atom. If desired, R, $R_1$ and $R_2$ can comprise a combination of two or more such radicals or a combination of one or more such radicals with one or more other divalent hydrocarbyl radicals, such as a substituted or unsubstituted aromatic or branched aliphatic radical, including straight chain or cyclic aliphatic radicals with two substituents per carbon atom or having substituent groups larger than methyl groups. Crystallinity of the polyphthalamides and heat deflection temperatures of glass fiber-filled compositions thereof tend to decrease with greater numbers of substituents per carbon atom and with larger substituent groups; accordingly, when a combination of such radicals with one or more straight chain or cyclic aliphatic divalent radicals with up to one methyl substituent per carbon atom is present, content of the former should not be so high that the polyphthalamide, when filled with 33 weight percent glass fibers, has a heat deflection temperature at 264 psi, according to ASTM D-648, below about 240° C. Suitable amounts of such other radicals vary depending on the precise structure thereof and can be determined by routine experimentation. As an example, if R, $R_1$ and $R_2$ are a combination of hexamethylene and 2,2,4- or 2,4,4- trimethyl hexamethylene, suitable heat deflection temperatures are attained when the mole ratio of hexamethylene or trimethyl hexamethylene divalent radicals is at least about 1.5:1.

Preferably, R, $R_1$ and $R_2$ comprise at least one divalent straight chain or cyclic aliphatic radical of about 4 to about 20 carbon atoms having up to one methyl substituent per carbon atom because the invented compositions containing a polyphthalamide component containing such radicals exhibit a desirable combination of melt processibility and thermal properties in articles molded therefrom. Examples of such preferred divalent radicals include tetramethylene, 2- and 3-methyl pentamethylene, hexamethylene, 2- and 3-methyl hexamethylene, 2,5-dimethyl hexamethylene, octamethylene, 1,2-, 1,3- and 1,4 cyclohexane, 3,3'-, 3,4'- and 4,4'-dicyclohexylmethane, and dodecamethylene. Most preferably, R, $R_1$ and $R_2$ comprise divalent hexamethylene having the structure $-(CH_2)_6-$.

A preferred polyphthalamide component of the invented compositions comprises a semicrystalline polyphthalamide of fast or intermediate crystallization rate based on at least one aliphatic diamine and terephthalic acid, isophthalic acid and adipic acid or terephthalic acid and adipic acid in which the mole ratio of the dicarboxylic acid moieties in units A, B and C, as depicted in the above formulas, is about 65-95:25-0:35-5, with about 65-75:25-15:10 being more preferred. Such polyphthalam ides based on various aliphatic diamines and preparation thereof are disclosed in detail in the aforementioned, commonly assigned U.S. Pat. No. 4,603,166 to Poppe et al., issued July 29, 1986, which is incorporated herein by reference. Particularly preferred among such polyphthalamides are those wherein R, $R_1$ and $R_2$ in the above formulas comprise divalent radicals derived from hexamethylene having the structure $-(CH_2)_6-$. Most preferably, each of R, $R_1$ and $R_2$ is $-(CH_2)6-$ and the mole ratio of dicarboxylic acid ties in the A, B and C units is about 65:25:10. Such polyphthalamides have melting points of about 300° to about 350° C., Tgs of about 80° to about 135° C. and inherent viscosities generally ranging from about 0.75 to about 1.4 dl/g, with about 0.9 to about 1.25 dl/g being preferred according to this invention from the standpoint of properties of molded parts and ease of molding. Heat deflection temperatures at 264 psi, according to ASTM D-648, of such polyphthalamides filled with 30-45 weight percent glass fibers and molded at about 120° C. generally range from about 480°-580° F. (250-305° C.) as disclosed in U.S. Pat. No. 4,603,166.

Also disclosed in U.S. Pat. No. 4,603,166 and suitable as the polyphthalamide component of the invented compositions are polyphthalamides of at least two of terephthalic acid, isophthalic acid and adipic acid compounds, in mole ratios of 65:35:0, 55:35:10, 60:30:10, 50:0:50 and 60:0:40, with hexamethylene diamine. As reported in the patent, the 5:35:0, 55:35:10 and 60:30:10 compositions filled with 30 weight percent glass fibers have heat deflection temperatures at 264 psi of about 115°-132° C. when molded using molds heated at about 120° C. With respect to the 50:0:50 and 60:0:40 compositions, the patent reports heat deflection temperatures at 264 psi of 181° F. (83° C.) and 203° F. (94° C.) when molded without fillers at unspecified mold temperature and heat deflection temperature at 264 psi of 563° F. (295° C.) for the 60:0:40 composition filled with 30 weight percent glass fibers molded at unspecified mold temperature. Tg of such polyphthalamides ranges from about 75° to 90° C. When molded using molds heated at about 96° C., heat deflection temperatures at 264 psi, according to ASTM D-648, of such compositions filled with 33 weight percent glass fibers exceed about 240° C., ranging from about 270° to 295° C.

Incorporation of thermotropic liquid crystalline polymer according to the present invention can reduce mold temperature requirements or molding cycle times. Mechanical properties, including tensile and flexural strength and modulus, of such polyphthalamides filled with fibers, especially about 10 to about 60 weight percent glass fibers, together with their melt processibility and low water absorption tendencies (e.g., in the case of the 33 weight percent glass fiber-filled polyphthalamides, water absorption generally is less than about four weight percent after immersion in boiling water for 120 hours) and good retention of mechanical properties when wet, make such filled polyphthalamide compositions particularly well suited for fabrication of injection molded articles for use in humid environments, for example pump housings.

While precise relationships between composition and heat deflection temperature are not fully understood, the foregoing discussion of suitable polyphthalamide compositions together with a number of general principles provide guidance in providing polyphthalamides of suitable composition and properties for purposes hereof. Generally, melting temperature, rate of crystallization and level of crystallinity in copolyamides of terephthalic acid and isophthalic acid compounds and hexamethylene diamine increase with increasing terephthalamide to isophthalamide mole ratios, other things being equal. Heat deflection temperature at 264 psi according to ASTM D-648 of such copolyamides, when filled with 33 weight percent glass fibers, also increases with increased terephthalamide to isophthalamide mole ratios. Similarly, increasing heat deflection temperatures of glass-filled compositions at increasing terephthalamide plus adipamide to isophthalamide mole ratios in their terpolyamides with hexamethylene diamine can be seen from the aforementioned, commonly assigned U.S. Pat. No. 4,603,166 to Poppe et al. Yu et al., *J. Poly. Sci.* 42, 249 (1960) reports that adipic acid and terephthalic acid are isomorphous in certain copolyamides, including those with hexamethylene diamine, such that replacement of terephthalic acid with adipic acid results in little change in melting point, although the authors acknowledge inability to prepare high terephthalic acid content copolyamides due to decomposition during the attempted preparations. Yu et al. also reports that crystallinity of polyamides decreases with increased branching of diamines used in preparation thereof, other things being equal.

Without wishing to be bound by theory, it appears that in the case of poly(hexamethylene phthalamides) consisting of at least two recurring units selected from the group consisting of hexamethylene terephthalamide, hexamethylene isophthalamide and hexamethylene adipamide units, there is a proportion of isophthalamide units, i.e., dicarboxylic acid moieties in units B in the above formulas, at or below which the polyphthalamides exhibit sufficient crystallinity and sufficiently high rates of crystallization during molding using a mold heated to at least Tg but below the melt crystallization temperature of the polyphthalamide that heat deflection temperatures at 264 psi, according to ASTM D-648, of the 33 weight percent glass fiber-filled compositions are normally at least about 240° C. Above a somewhat greater proportion of hexamethylene isophthalamide units, crystallinity and rates of crystallization are so low that the so-determined heat deflection temperatures of the 33 weight percent glass fiber-filled compositions normally are less than about 240° C. Between these levels of isophthalamide units, the so-determined heat deflection temperatures of the 33 weight percent glass fiber-filled compositions normally are at least about 240° C. provided that the remaining units of the composition include hexamethylene terephthalamide units and the mole ratio of hexamethylene terephthalamide units to hexamethylene isophthalamide units is high enough.

More specifically, such poly(hexamethylene phthalamides) consisting of about 19 to about 35 mole percent hexamethylene isophthalamide units based on total amide units, i.e., wherein the dicarboxylic acid moieties in units corresponding to the formula B above are about 19 to about 35 mole percent of the total dicarboxylic acid moieties, when filled with 33 weight percent glass fibers and molded using a mold heated above Tg but below Tcm, normally have heat deflection temperatures at 264 psi according to ASTM D-648 of at least about 240° C. when the mole percentage of hexamethylene terephthalamide units (i.e., dicarboxylic acid moieties in units corresponding to formula A above) is at least about four times the mole percent hexamethylene isophthalamide units minus 75 percent. At hexamethylene isophthalamide unit contents in the upper portion of the aforesaid range of about 19 to about 35 mole percent, heat deflection temperatures at 264 psi of at least about 240° C., according to ASTM D-648, in respect of the 33 weight percent glass fiber-filled polyphthalamides normally are attained or can be attained through the use of nucleators, increased mold temperatures or annealing after molding. Below about 19 mole percent hexamethylene isophthalamide units, heat deflection temperatures at 64 psi, according to ASTM D-648, of the so-filled and so-molded compositions normally exceed about 240° C. whether the remaining units are all hexamethylene terephthalamide units, all hexamethylene adipamide units or a combination of hexamethylene terephthalamide units and hexamethylene adipamide units in any proportion. Above about 35 mole percent hexamethylene isophthalamide units, the poly(hexamethylene phthalamides) normally are amorphous or so slow to crystallize that the requisite heat deflection temperature at 264 psi, according to ASTM D-648, normally is not attained even with the use of nucleating agents, annealing or high temperature molds. Thus, polyphthalamides comprising at least two recurring units selected from the group consisting of terephthalamide, isophthalamide and adipamide units which, when filled with 33 weight percent glass fibers, have heat deflection temperatures, according to ASTM D-648, of at least about 240° C. include poly(hexamethylene phthalamides) consisting of at least two recurring units selected from the group consisting of hexamethylene terephthalamide, hexamethylene isophthalamide and hexamethylene adipamide units wherein the mole percent of the dicarboxylic acid moieties in the hexamethylene isophthalamide units based on total dicarboxylic acid moieties is 0 to about 35 mole percent; provided that when the mole percent of dicarboxylic acid moieties in the hexamethylene isophthalamide units is about 19 to about 35 mole percent, the mole percentages of dicarboxylic acid moieties in the hexamethylene terephthalamide, hexamethylene adipamide and hexamethylene isophthalamide units based on total dicarboxylic acid moieties (referred to below as $M_T$, $M_A$ and $M_I$, respectively) satisfy the following formulas:

$$M_T \geq 4 M_I - 75 \qquad (1)$$

$$M_T M_I + M_A = 100 \qquad (2)$$

Other suitable polyphthalamide compositions, for example, those based on diamines other than or in addition to hexamethylene diamine or comprising, in addition to at least two recurring units selected from terephthalamide, isophthalamide and adipamide units, other dicarboxylic acid amide units, can be employed if desired, suitability of specific compositions being easily determined based on heat deflection temperatures at 264 psi of the 33 weight percent glass-filled compositions, according to ASTM D-648, molded using a mold heated to above Tg but below Tcm of the polyphthalamide.

The polyphthalamide component of the invented compositions can be prepared from the appropriate starting materials, e.g., dicarboxylic acids or their derivatives and diamines, in suitable proportions by any suitable means. As disclosed in U.S. Pat. No. 4,603,166, one such preparation involves a salt preparation step, preferably conducted batchwise to achieve proper stoichiometry, wherein dicarboxylic acid compounds, diamine and solvent are added to a suitable reaction vessel in appropriate amounts and maintained under conditions effective to cause salt formation but avoid appreciable conversion of salts to oligomers. Water is a preferred solvent and temperature is preferably maintained below about 120° C. to minimize conversion. Product of the salt preparation step can be introduced into a condensation section operated either batchwise or in continuous mode. In the condensation section substantial conversion of salts to polymer takes place. The condensation product then typically is introduced into a finishing section, such as a twin-screw extruder, to obtain further conversion and generally increase inherent viscosity from a level of about 0.1 to about 0.6 dl/g achieved in the condensation section up to about 0.8 dl/g or greater. The polymeric product can be recovered from the finishing section and, for example, pelletized or mixed with fillers, additives and the like. Commonly assigned U.S. Pat. No. 4,603,193, issued July 29, 1986, to Richardson et al., also discloses preparation of such polyamides.

Reinforcing fibers contained in the invented compositions are inorganic or organic fibers having sufficiently high modulus to provide reinforcement to the polyphthalamide component and capable of withstanding temperatures employed in melt processing the invented compositions. Preferred fibers have modulus of at least about two million psi in order to achieve substantial increases in mechanical properties relative to those of the polyphthalamide component. Specific examples of suitable reinforcing fibers include glass, graphite, boron, ceramic and aramid fibers, with glass fibers being most preferred. Specific examples of glass fibers include alkali-free, boron-silicate glass or alkali-containing C-glass. Suitably, average thickness of the fibers is, between about 3 and 30 microns. It is contemplated to use long fibers e.g., ranging from about 5 mm to about 50 mm, and also short fibers, e.g., from about 0.05 mm to about 5 mm. In principle, any standard commercial grade fiber, especially glass fibers, can be used.

Preferred glass fibers for injection molding applications have lengths of about 0.25 mm to about 25 mm. While longer or shorter fibers are suitable, the former can be difficult to disperse in the polyphthalamide component, thereby lessening their reinforcing effect. Shorter fibers are easily dispersed but provide less reinforcement due to their low aspect ratio.

The fibers can be sized or unsized and may include a coupling agent to improve adhesion of the fibers to the polyphthalamide component. Commercially available glass fibers supplied with sizing agent applied thereto can be used as such or with the size removed, for example by abrasion. Sizing agents resistant to degradation or release of volatiles at temperatures employed in processing the invented compositions are preferred; examples include polyesters and polyester-urethanes. Examples of coupling agents include various silane, titanate and chromium compounds as known to those skilled in the art.

The invented compositions contain reinforcing fibers in an amount effective to provide mechanical property reinforcement to the polyphthalamide component though not at such a high level as to substantially adversely affect melt processibility of the compositions. Suitably, about 10 to about 200 parts by weight reinforcing fibers per hundred parts by weight of the polyphthalamide component are used as lesser amounts provide insufficient reinforcement while higher amounts can be difficult to disperse uniformly in the polyphthalamide component and increase melt viscosity such that melt processibility may be sacrificed. Preferably, about 15 to about 100 parts by weight fibers per hundred parts by weight polyphthalamide component are used to obtain substantial reinforcement while maintaining processibility.

To enhance the ability of the invented compositions to resist thermal distortion, the invented compositions also contain an additional component comprised of a thermotropic liquid crystalline polymer in an amount sufficient to nucleate a melt of the polyphthalamide.

Without wishing to be bound by theory, it appears that in the mesomorphic structure of a TLCP is uniquely suited to nucleate a melt of thermoplastic polymer such as polyphthalamide. While the molecules of a TLCP, usually fully aromatic polyesters, in the mesophase are free to move and disperse throughout a melt similar to liquids, the solid-like order of long-chain organic molecules provide sufficient particulate qualities to nucleate the melt, even at relatively low TLCP concentrations.

Certain polyesters are known to exhibit melt anisotropy of TLCPs. See, for instance, (a) Polyester X7G-A Self Reinforced Thermoplastic, by W. J. Jackson, Jr., H. F. Kuhfuss, and T. F. Gray, Jr., 30th Anniversary Technical Conference, 1975 Reinforced Plastics Composites Institute, The Society of the Plastics Industry, Inc., Section 17-D, Pages 1-4; (b) Belgian Pat. Nos. 828,935 and 28,936; (c) Dutch Pat. No. 7505551; (d) West German Nos. 520819, 2520820, 2722120, 2834535, 2834536 and 2834537; (e) Japanese Nos. 43-223; 2132-116; 3017-692; and 3021-93; (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 5,245,082; 4,245,084; 4,247,514; 4,256,624; 4,265,802; 4,267,289; 4,267,304; 4,269,965;

4,272,625; 4,279,803; 4,284,757; 4,285,852; 4,287,332; 4,294,955; 4,299,756; 4,311,824; 4,314,073; 4,318,841; 4,318,842; 4,330,457; 4,332,759; 4,333,907; 4,335,232; 4,337,190; 4,337,191; 4,339,375; 4,341,688; 4,346,208; 4,347,349; 4,351,917; 4,351,918; 4,355,132; 4,355,133; 4,355,134; 4,359,569; 4,360,658; 4,362,777; 4,370,466; 4,371,660; 4,374,288; 4,375,530; 4,381,389; 4,384,016; 4,393,191; 4,394,498; 4,395,307; 4,395,536; 4,408,022; 4,421,908; 4,429,060; 4,429,061; 4,429,100; 4,429,105; 4,431,770; 4,434,262; 4,460,735; 4,460,736; 4,489,190; 4,727,131 and 4,792,587; (g) U.K. Application No. 2,002,404; (h) British Pat. No. 1,568,541; and (i) European Patent Application Nos. 24,499 and 5,499. Amide groups and/or carbonate groups additionally may be present in the polyesters which exhibit melt anisotropy.

TLCPs suitable for use in the present invention include but are not limited to wholly aromatic polyesters, aromatic-aliphatic polyesters, aromatic polyazomethines, wholly and non-wholly aromatic poly(esteramide)s and aromatic polyester-carbonates. Of these wholly aromatic polyesters and wholly and non-wholly aromatic poly(esteramide)s are preferred. They all contain naphthalene moieties along the backbone to provide the necessary disruption of packing so that infusible crystals are not formed.

Typically, wholly aromatic thermotropic liquid crystal polymers are comprised of moieties which contribute at least one aromatic ring to the polymer backbone and which enable the polymer to exhibit anisotropic properties in the melt phase. Such moieties include but are not limited to aromatic diols, aromatic amines, aromatic diacids and aromatic hydroxy acids.

TLCPs which are suitable for use in the present invention include polyesters and poly(ester-amide)s which are disclosed in U.S. Pat. Nos. 4,067,852; 4,083,829; 4,130,545; 4,161,470; 4,161,470; 4,184,996; 4,219,461; 4,238,599; 4,256,624; 4,267,289; 4,267,304; 4,276,625; 4,276,397; 4,279,803; 4,299,756; 4,330,457; 4,337,191; 4,460,735; 4,460,736; 4,489,190; 4,567,277; 4,727,131; and 4,792,587. The disclosures of all of the above-identified U.S. patents are herein incorporated by reference in their entirety. TLCPs disclosed therein typically are capable of forming an anisotropic melt phase at a temperature below approximately 400° C., and preferably below approximately 350° C. Of these TLCPs comprising recurring p-oxybenzoyl moieties are preferred. Especially preferred are TLCPs comprising recurring 6-oxy-2-naphthyol and p-oxybenzoyl moieties.

TLCPs suitable for use in the present invention tend to be substantially insoluble in common solvents and accordingly are not susceptible to solution processing. However, they can be readily processed by common melt processing techniques. Most suitable wholly aromatic polymers are soluble in pentafluorophenol to a limited degree.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(esteramide)s which are preferred commonly exhibit a molecular weight of about 5000 to 50,000 and preferably about 10,000 to 30,000; e.g., 15,000 to 17,000. Such molecular weight may be determined by gel permeation chromatography as well as by standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and poly(esteramide)s additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

For best results the polyphthalamide-TLCP combination in the invented compositions is selected to have the mesomorphic state of the TLCP present in a melt of the polyphthalamide. In preferred polyphthalamide-TLCP combinations, the polyphthalamide component has a melting temperature in a range from about the melting temperature of the liquid crystalline polymer to the decomposition temperature of the liquid crystalline polymer.

Especially preferred wholly aromatic thermotropic polyesters use 2,6 functionally disubstituted naphthalene monomers. Such products are prepared from hydroxybenzoic acid (HBA) and 6-hydroxy-2-naphthoic acid ("HNA").

The wholly aromatic polyester which is disclosed in U.S. Pat. No. 4,161,470 is a melt processable wholly aromatic polyester capable of forming an anisotropic melt phase at a temperature below approximately 350° C. The polyester consists essentially of the recurring moieties I and II wherein:

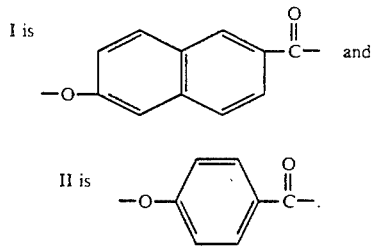

The polyester comprises approximately 10 to 90 mole percent of moiety I, and approximately 10 to 90 mole percent of moiety II. In a preferred embodiment, moiety II is present in a concentration of approximately 60 to 90 mole percent, and more preferably in a concentration of approximately 70 to 90 mole percent, e.g., approximately 90 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The polyester disclosed in U.S. Pat. No. 4,219,461 is a melt processable wholly aromatic polyester which is capable of forming an anisotropic melt phase at a temperature below approximately 320° C. The polyester consists essentially of the recurring moieties I, II, III, and IV wherein:

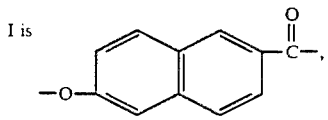

II is 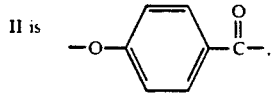

III is a dioxy aryl moiety of the formula —O—Ar—O— wherein Ar is a divalent radical comprising at least one aromatic ring, and IV is a dicarboxyl aryl moiety of the formula

wherein Ar' is a divalent radical comprising at least one aromatic ring, and wherein the polyester comprises approximately 20 to 40 mole percent of moiety I, in excess of 10 up to about 50 mole percent of moiety II; in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g., approximately 20) mole percent of moiety III, and approximately 15 to 25 (e.g., approximately 20) mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred moieties III and IV are set forth in above-noted U.S. Pat. No. 4,219,461. The preferred dioxy aryl moiety III is:

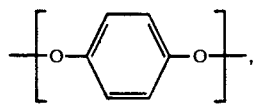

and the preferred dicarboxy aryl moiety IV is:

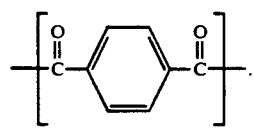

The object of the present invention is to incorporate particulates of a liquid crystal polymer in an amount and having the requisite physical characteristics sufficient to render a thermoplastic molding composition resistant to thermal distortion within the meaning of ASTM test D-648.

According to the present invention, TLCP may be added to polyphthalamide molding compositions in sufficient amounts to enhance the heat distortion temperature while substantially maintaining the mechanical properties of the polyphthalamide. Such amounts generally range from about 0.01 and less to about 75–100 parts by weight of the TLCP per one hundred parts by weight of the polyphthalamide component. The composition of the present invention comprises approximately 0.01 to approximately 75 parts by weight of the TLCP per one hundred parts by weight of the polyphthalamide component. Preferably, the composition comprises approximately 0.01 to approximately 50 parts by weight of the TLCP per one hundred parts by weight of the polyphthalamide component. More preferably, the composition comprises approximately 0.02 to approximately 25 parts by weight of the TLCP per one hundred parts by weight of the polyphthalamide component.

The particulates can be compounded into the molding resin by any suitable means. For example, the particulates can be premixed with the resin together with other additives such as flame retardants, reinforcing agents, etc. with the admixture then being melt extruded.

The compositions according to this invention can be prepared by combining the polyphthalamide component, reinforcing fibers and TLCP by any suitable means. Conveniently, polyphthalamide component in powder or pellet form and the other components are melt compounded in desired amounts, at a temperature effective to render the polyphthalamide component molten without degradation thereof, in a high shear mixer, e.g., a twin-screw extruder, to obtain substantially uniform dispersion of fibers and TLCP in the polyphthalamide. Use of kneading blocks or other suitable mixing elements in compounding aids in achieving a high degree of dispersion of the components. To minimize degradation of the polyphthalamide component, preferred temperatures when using a twin-screw mixer are equal to or up to about 20° C. greater than the melting point of the component. Blending of the components in solid form prior to melt compounding can be conducted to facilitate melt blending. Fibers and TLCP also can be incorporated by feeding the same to the molten polyphthalamide in an extruder or other compounding apparatus or by other suitable methods.

The invented compositions also can contain pigments, stabilizers, fillers, extenders, flame retardants, lubricants, impact modifiers and other suitable additives to improve or modify properties. As noted hereinabove, U.S. Pat. No. 3,755,221 to Hitch discloses various alkylene diamides, e.g., $C_{1-16}$ alkylenediamides of lauric, myristic, palmitic, stearic and other saturated or unsaturated monocarboxylic acids, as mold release agents and metal carboxylates, e.g., lithium, sodium, potassium, magnesium salts of $C_{12-20}$ monocarboxylic acids, as lubricants. Other conventional additives include mold lubricants such as stearyl alcohol, metallic stearates and ethylene bis-stearamide and heat stabilizers such as alkali metal halides and combinations thereof with copper salts as taught in U.S. Pat. No. 3,830,777 to Burton, issued Aug. 20, 1974, and phosphorus acid, sodium or alkyl or aryl phosphates and phosphites, various cupric salts of organic or inorganic acids, such as cupric acetate and butyrate, and alkali or alkaline earth metal halides, such as sodium iodide and potassium iodide as taught in U.S. Pat. No. 2,705,227 to Stamatoff issued Mar. 24, 1955. Preferred heat stabilizers for the invented compositions are potassium iodide, sodium iodide and combinations thereof as well as combinations of either or both with cupric acetate; preferred mold release agents include aluminum distearate, hexamethylene bis-stearamide wax and combinations thereof. When used, preferred levels range from about 0.01 to about 2 parts by weight heat stabilizer, with about 0.01 to about 1.5 parts iodide salt and about 0.01 to about 0.5 parts cupric acetate when using combinations of the same, per hundred parts by weight polyphthalamide component. Preferred levels of such mold release agents range from about 0.01 to about 5 parts by weight per hundred parts by weight of the invented compositions.

The invented compositions are particularly useful as injection molding compounds for production of molded objects such as electronic connectors, switch components, pump housings, valve components and under-the-hood automobile parts. Injection molding of such compositions generally is conducted using standard injection molding equipment. Injection molding generally is accomplished by heating the invented compositions to above the melting point of the polyphthalamide component thereof but not so high as to substantially degrade the same, injecting the composition into a mold maintained at a temperature of about 100° C. below Tg of the polyphthalamide component to about 75° C. above such Tg and maintaining the composition in the mold for a time effective to solidify the molten polyphthalamide component. A 20 second to 1 minute cycle, barrel temperatures generally ranging from about 300° to about 400° C. and mold temperatures of about 25° C. to about 200° C. are suitably employed with specific temperatures varying depending on melting point, degradation temperature and Tg of the polyphthalamide component. In a preferred embodiment of the invention, the invented compositions in which the polyphthalamide component has a Tg up to about 125° C. are heated at about 310 to about 360° C. to melt the component and molded using a steam—or hot water heated mold at about 100° C.±10° C.

The present invention is described further in connection with the following examples and control examples, it being understood that the same are for purposes of illustration and not limitation.

EXAMPLES

General

The naphthalene-based polyester identified as commercial TLCP in the instant examples was Vectra A950, produced by the Hoechst-Celanese Corporation and composed of about 73 mole percent 4-oxybenzoyl moieties,

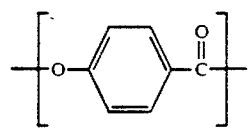

and about 27 mole percent of 6-oxy-2-naphthoyl moieties,

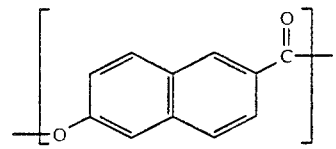

EXAMPLE 1

To a large, stainless steel, stirred reactors, each having oil jacket heating systems, were added quantities of a 70-80 weight percent solution of hexamethylene diamine in water, adipic acid, isophthalic acid and terephthalic acid such that the mole fraction of the components was about 110/65/25/10. About one mole percent benzoic acid, based on total moles of diamine and diacids, was added as a capping agent. Temperature increased during addition of the acids to 70° C. 800 parts per million sodium hypophosphite catalyst then were added to the reactors after which each was sealed, purged with nitrogen, leaving a 5.64 kg/cm$^2$ (80 psig) nitrogen blanket in the reactors, and then heated to about 120° C. and held at that temperature. The reactors were used in parallel to provide continuous feed of salt solution to downstream processing by alternating from one reactor to another.

Contents of the stirred tank were pumped continuously to a jacketed, oil-heated, stirred tank and maintained under pressure of 12.7 kg/cm$^2$ (180 psig) therein using a microprocessor-controlled Research Control Valve. The reactor was heated to about 200° C. Residence time in the reactor under such conditions was about 15 minutes, resulting in decrease in water content from about 35 weight percent based on weight of the materials in the initial charge to about 15 weight percent based on weight of material exiting the stirred tank.

Contents of the stirred tank were pumped continuously to and through two jacketed, oil heated, stainless steel pipes of 0.95 cm inner diameter and lengths of 274 and 401 cm in series at a rate of about 8.2 kg/hour using a dual headed Bran-Lubbe piston pump. The first pipe was maintained at about 315°–325° C. and the second at about
325°–335° C. both under pressure of about 128 kg/cm$^2$ (1820 psi).

Contents of the second heated pipe were passed continuously through the Research Control Valve to a jacketed tube of about 0.94 cm inner diameter and about 274 cm length, equipped with thermocouples to monitor temperatures in the tube and between the outer wall of the tube and inner wall of the jacket, under pressure of about 7.8 kg/cm$^2$ (110 psig) with 325°–345° C. heat exchange fluid circulating in the heating jacket. Flashing of volatiles in the feed to the tube occurred in an upstream portion thereof.

Contents of the tube, comprising water vapor and molten polymer, were introduced onto the screws of a Werner and Pfleiderer Corporation ZSK-30, twin-screw extruder. Volatiles were allowed to escape through a rear vent in the extruder barrel. Polymer was conveyed between screw flights with the screws rotating at 100 rpm and the extruder barrel heated at 300° to 330° C. Polymer was extruded through a strand die of about 0.24 cm diameter, pressed into a water bath and then chopped into pellets. Inherent viscosity of the resulting polyphthalamide was about 0.88 dl/g. Melting point was 312° C. Melt crystallization temperature was 270° C. and Tg was 121°.

EXAMPLE 2

A sample of the polyphthalamide prepared as in Example 1, except having an inherent viscosity ("IV") of 0.85 dl/g, was dried to a maximum moisture content of about 1000 ppm in a vacuum oven at 110° C. for about 14 hours. Thereafter, about 9.08 kg of the polyphthalamide, about 3.53 kg glass fibers 3 mm long and identified as PPG 3540 obtained from PPG Corp. and about 127.4 grams of Vectra A950, a commercial TLCP obtained from Hoechst-Celanese Corporation, were tumbled to thoroughly mix the components and then the tumbled mixture was compounded using a Werner and Pfleiderer ZSK-30 twin-screw extruder operated at a screw speed setting of 50 rpm and barrel temperature settings of 275° C. in a first zone, 320° C. in intermediate zones and 310° C. in the final zones. Screw configuration consisted of initial sections having relatively long pitch followed by spike-like sections, compression sections and final sections of longer pitch. Gas present was allowed to escape from the extruder barrel through a vent port located near the barrel outlet. The composition exited the extruder through a strand die having a circulate, 0.24 cm diameter orifice. Screw torque was 19% and die pressure was about 175 psi. The extrudate was cooled and chopped into pellets.

EXAMPLE 3

A sample containing 390 grams of commercial TLCP, was added to 9.08 kg of polyphthalamide, similar to Example 1 except having an IV of 0.85 dl/g, and 3.53 kg of PPG 3540 glass fibers according to the conditions of Example 2.

EXAMPLE 4

A sample containing 663.7 grams of commercial TLCP, was added to 9.08 kg of polyphthalamide, similar to Example 1 except having an IV of 0.85 dl/g, and 3.53 kg of PPG 3540 glass fibers according to Example 2.

EXAMPLE A

A sample of 9.08 kg of polyphthalamide, similar to Example 1 except having an IV of 0.85 dl/g, but without TLCP, was added to 3.53 kg of PPG 3540 glass fibers and melt homogenized according to Example 2.

EXAMPLE 5 and EXAMPLE B

Resins from Example 2-4, A and Vectra 2130-30, a commercial counterpart of Vectra A950 containing 30% glass fiber from Hoechst-Celanese Corporation, identified as Example B, were dried for about 16 hours at 80° C. in a desiccant tray oven. The resinous material was then injection molded into ASTM test bars on a 40 MM Battenfeld injection molding press having a L/D ratio of 13:1 under the following conditions.

| | |
|---|---|
| Rear Zone temperature setting: | 327° C. |
| Middle Zone temperature setting: | 332° C. |
| Front Zone temperature setting: | 338° C. |
| Nozzle temperature setting: | 320° C. |
| Injection line pressure: | 133 kg/cm2 |
| Hold line pressure: | 70 kg/cm2 |
| Back pressure: | 10.5 kg/cm2 |
| Screw speed: | 100 rpm |
| Injection rate: | 2 turns |
| Clamp close time: | 18 seconds |
| Injection Hold time | 10 seconds |
| Clamp pressure: | Maximum |
| Mold Temperature setting: | 88° C. and 149° C. |

Testing of Molded Resins of Example 5

Test results of molded resins from Example 2-4, A, and B are reported in Table 1 below. Samples have been molded under conditions described in Example 5 above. The mold temperature was set at 88° C. and 149° C. To achieve mold temperature above 100° C., oil or electric heat is required.

TABLE 1

| Properties | | | | | |
|---|---|---|---|---|---|
| | Example | | | | |
| | 2 | 3 | 4 | A | B |
| Ultimate Tensile Strength D-638 kg/cm2 | | | | | |
| 88° C. mold setting | 1947 | 1975 | 2032 | 1786 | 1482 |
| 149° C. mold setting | 1940 | 1982 | 2010 | 1758 | — |
| Flexural Modulus D-790 kg/cm2 | | | | | |
| 88° C. mold setting | 112490 | 12490 | 113897 | 104757 | 132880 |
| 149° C. mold setting | 107569 | 111085 | 112490 | 108270 | — |
| HDT at 264 psi D-648 °C. | | | | | |
| 88° C. mold setting | 276 | 278 | 277 | 142 | 224 |
| 149° C. mold setting | 287 | 286 | 287 | 277 | — |
| Density D792 g/cc | | | | | |
| 88° C. mold setting | 1.4598 | 1.4644 | 1.4689 | 1.4528 | — |
| 149° C. mold setting | 1.4611 | 1.4649 | 1.4709 | 1.4566 | — |

The above heat deflection temperatures (HDT) illustrate the improvement in heat resistances of the polyphthalamide when low levels of a liquid crystal polymer are added to the blend. The HDT improvements are especially significant when comparing parts mold cooled in an 88° C. mold. The control polyphthalamide sample had a two-tone appearance, an opaque core and a translucent skin while the polyphthalamide blend containing a liquid crystalline polymer exhibited a homogeneous white color. The use of the liquid crystalline polymer as an organic whitening agent for polyphthalamide is especially important in achieving a cosmetically appealing surface.

To illustrate the improvement in heat resistances after annealing, retain samples were annealed at 200° C. for 2 hours and the HDT was measured. The increase in HDT from annealing is also reported in Table 2. Note that after annealing, the HDT values approach the maximum value for the resin independent of mold temperature.

TABLE 2

| | Example | | | | |
|---|---|---|---|---|---|
| | 2 | 3 | 4 | A | B |
| Annealed Properties | ASTM D-648 | Units °C. | | | Control |
| HDT at 264 psi | | | | | |
| 88° C. mold setting | 284 | 286 | 285 | 277 | 232 |
| 149° C. mold setting | 286 | 287 | 287 | 281 | — |
| HDT increase after annealing | | °C. | | | |
| 88° C. mold setting | 8 | 8 | 8 | 135 | 7 |
| 149° C. mold setting | −1 | 1 | 0 | 4 | — |

Note the significant increase in HDT of the control sample after annealing the bars molded in an 88° C. tool. The polyphthalamide resins containing small loadings of a TLCP did not show this significant increase in HDT after annealing, a good indication of the nucleation effect of the TLCP on the polyphthalamide compositions.

Molded parts from Examples 2, 3 and A, cooled in a 88° C. mold, have been thermally analyzed using a differential scanning calorimeter to determine if a difference in the level of as-molded crystallinity, as measured by the net heat of fusion, exists between skin and core sections of the molded parts. Note that during mold cooling, a cooling rate gradient exists between skin and core. This results in the core having a longer time to cool at higher temperatures resulting in greater crystallinity and thus a crystallinity gradient between skin and core sections of the molded bar. This crystallinity gradient is especially apparent in those materials that do not crystallize rapidly.

Skin and core sections of each sample have been cut using a Buehler Isomet low speed saw. The thin specimens are then dried at 80° C. under vacuum over night. Note that post crystallization will not occur under these conditions since samples are dried about 40° C. below the glass transition temperature of the part. A 10 mg sample is then run on a Dupont differential scanning calorimeter interfaced with an Omnitherm 35050 controller. Data from the first heat have been used to determine the net heat of fusion for skin and core samples. The net heat of fusion is determined by subtracting out the heat of cold crystallization from the heat of fusion as shown in Table 3.

TABLE 3

| | Example | | |
|---|---|---|---|
| | 2 | 3 | A |
| Heat of cold crystallization (cal/g) | | | |
| skin | −1.2 | −1.1 | −5.8 |
| core | −.7 | −.3 | −.4 |
| Heat of Fusion (cal/g) | | | |
| skin | 7.6 | 7.4 | 7.3 |
| core | 7.7 | 8.8 | 7.1 |
| Net Heat of Fusion (cal/g) | | | |
| skin | 6.4 | 6.3 | 1.5 |
| core | 7.0 | 8.5 | 6.7 |

Mold temperature setting 88° C.

A small difference in the net heat of fusion between skin and core is seen with the polyphthalamide samples containing small quantities of the TLCP, unlike the polyphthalamide control sample. Note that the greater the heat of fusion, the greater the crystallinity. The heat of cold crystallization is the crystallization that occurs from the glassy state during the DSC heating of the sample. The skin sample of the control (Example A) has a large amount of cold crystallization while the core sample has only a trace of cold crystallization. Cold crystallization occurs when the material is quenched during molding, halting crystallization before it can come to completion. The closer the net heat of fusion of the skin and core sample, the more uniform the crystallization throughout the sample. These results indicate that the polyphthalamide containing small quantities of the TLCP crystallizes faster, allowing for more skin crystallinity, than polyphthalamide containing no TLCP.

EXAMPLE 6

A sample containing 825.6 grams of commercial TLCP of Example 2 and 3.3022 kg of polyphthalamide, similar to Example 1, was melt homogenized on a Killion single two stage screw extruder at 100 RPM's at a rate of 5 lbs/hr. The zone temperatures were set between 315°–321° C. while the die temperature was set at 310° C.

EXAMPLE 7

A sample containing 56.9 grams of Example 6 was melt homogenized with 5.7166 kg of polyphthalamide, similar to Example 1, and 2.8441 kg of PPG 3540 fiberglass according to Example 2 conditions. The resulting composition contains 0.2 parts TLCP and 99.8 parts polyphthalamide per 100 parts by weight of total polymer.

EXAMPLE 8

A sample containing 144.8 grams of Example 6 was melt homogenized with 5.6295 kg of polyphthalamide, similar to Example 1, and 2.8441 kg of PPG 3540 fiberglass according to Example 2 conditions. The resulting composition contains 0.5 parts TLCP and 99.5 parts polyphthalamide per 100 parts by weight of total polymer.

EXAMPLE 9

A sample containing 288.7 grams of Example 6 was melt homogenized with 5.4856 kg of polyphthalamide, similar to Example 1, and 2.8441 kg of PPG 3540 fiberglass according to Example 2 conditions. The resulting composition contains 1.0 parts TLCP and 99.0 parts polyphthalamide per 100 parts by weight of total polymer.

EXAMPLE 10

A sample containing 486.3 grams of the commercial TLCP was melt homogenized with 1.945 kg of polyphthalamide, similar to Example 1, and 1.1197 kg of PPG 3540 fiberglass according to Example 2 conditions. The resulting composition contains 20.0 parts TLCP and 80.0 parts polyphthalamide per 100 parts of total polymer.

EXAMPLE 11

A sample containing 972.5 grams of commercial TLCP was melt homogenized with 1.4588 kg of polyphthalamide, similar to Example 1, and 1.1197 kq of PPG 3540 fiberglass according to Example 2 conditions. The resulting composition contains 40.0 parts TLCP and 60.0 parts polyphthalamide per 100 parts of total polymer.

EXAMPLE C

A control sample containing 5.440 kg of polyphthalamide, similar to Example 1, and 2.6794 kg of PPG 3540 fiberglass was prepared according to Example 2 conditions.

Testing of Resins from Example 7–11, B and C

Resins from Example 7–11 were dried for about 16 hours at 80° C. in a desiccant tray oven. The resinous material was then injection molded into ASTM test bars on a 40 MM Battenfeld injection molding press having a L/D ratio of 13:1 following Example 5 conditions except the mold temperature was set at 38° C., 66° C., 93° C. and 121° C. Parts were tested for flexural modulus (FM) following ASTM D-790 procedure; tensile strength (UTS) following ASTM D-638 procedure;

Notched Izod impact strength (Izod) following ASTM D-256; and heat deflection temperature at 264 psi (HDT) following ASTM D-648 procedure. The results of testing these resins are reported in Table 4.

able thermal properties without the costly expense of annealing. The results also demonstrate the ability to mold polyphthalamide in tools set below the boiling point of water if small quantities of a TLCP are added

TABLE 4

|  | Example | | | | | | |
|---|---|---|---|---|---|---|---|
|  | 7 | 8 | 9 | 10 | 11 | C | B |
|  | Parts per 100 parts total polymer | | | | | | |
| Commercial TLCP | .2 | .5 | 1.0 | 20.0 | 40.0 | 0 | 100 |
| Polyphthalamide | 99.8 | 99.5 | 99.0 | 80.0 | 60.0 | 100 | 0 |
| Mold Temperature | | | | | | | |
| UTS Kg/cm | | | | | | | |
| 38° C. | 1926 | 1983 | 1835 | — | — | 1989 | — |
| 66° C. | 2032 | 1919 | 1856 | — | — | 1877 | — |
| 93° C. | 1694 | 1870 | 1877 | 1926 | 1554 | 1800 | 1568 |
| 121° C. | 1962 | 1914 | 1835 | — | — | 1926 | — |
| FM Kg/cm$_2$ × 10$^{-4}$ | | | | | | | |
| 38° C. | 10.8 | 10.5 | 10.0 | — | — | 10.0 | — |
| 66° C. | 11.1 | 10.6 | 10.2 | — | — | 10.6 | — |
| 93° C. | 10.6 | 10.6 | 10.6 | 11.2 | 12.7 | 10.4 | 13.3 |
| 121° C. | 10.9 | 10.5 | 10.1 | — | — | 10.2 | — |
| Izod Kg-cm/cm | | | | | | | |
| 38° C. | 10.3 | 10.3 | 9.8 | — | — | 10.3 | — |
| 66° C. | 11.4 | 10.3 | 9.8 | — | — | 9.8 | — |
| 93° C. | 9.8 | 10.3 | 9.8 | 11.4 | 10.9 | 10.9 | 18.0 |
| 121° C. | 10.9 | 10.3 | 9.8 | — | — | 10.3 | — |
| HDT at 264 psi °C. | | | | | | | |
| 38° C. | 265 | 270 | 267 | — | — | 240 | — |
| 66° C. | 268 | 270 | 267 | — | — | 243 | — |
| 93° C. | 268 | 272 | 274 | 275 | 256 | 251 | 224 |
| 121° C. | 281 | 277 | 277 | — | — | 269 | — |
| Part Inherent viscosity dl/g | | | | | | | |
| 66° C. | .75 | .75 | .71 | — | — | .81 | — |
| Insolubles % | | | | | | | |
| 66° C. | 31.6 | 28.0 | 28.6 | — | — | 29.9 | — |
| 93° C. | 28.5 | 29.0 | 28.3 | 50.2 | 58.3 | 30.1 | — |

Note (1):
Percent insolubles are determined during filtration of the inherent viscosity solution and are composed mainly of glass fibers and the insoluble TLCP.

To illustrate the improvement in heat resistances after annealing, retain samples were annealed at 200° C. for 2 hours and the HDT was measured. The increase in HDT from annealing is also reported in Table 5. Note that after annealing, the HDT values approach the maximum value for the resin.

TABLE 5

| | Annealed Properties | | | | | | |
|---|---|---|---|---|---|---|---|
| | Example | | | | | | |
| | 7 | 8 | 9 | 10 | 11 | C | B |
| Mold Temperature | | | | | | | |
| HDT at 264 psi | | | | | | | |
| 38° C. | 277 | 280 | 278 | — | — | 275 | — |
| 66° C. | 281 | 281 | 282 | — | — | 278 | — |
| 93° C. | 281 | 282 | 281 | 278 | 264 | 274 | 232 |
| 121° C. | 279 | 285 | 281 | — | — | 281 | — |
| Increase in HDT after annealing | | | | | | | |
| 38° C. | 12 | 10 | 11 | — | — | 35 | — |
| 66° C. | 13 | 11 | 15 | — | — | 35 | — |
| 93° C. | 13 | 10 | 7 | 3 | 8 | 23 | 9 |
| 121° C. | −2 | 8 | 4 | — | — | 12 | — |

Note the significant increase in HDT of the control (Example C) sample after annealing bars mold cool in tools set below 100° C. The polyphthalamide resins containing small loadings of a commercial TLCP showed only a modest increase in HDT after annealing, a good indication of the nucleation effect of the TLCP on the polyphthalamide. The above HDT results indicate the need to mold cool polyphthalamide at temperatures above the boiling point of water to achieve desirable thermal properties without the costly expense of annealing. The results also demonstrate the ability to mold polyphthalamide in tools set below the boiling point of water if small quantities of a TLCP are added as a nucleator, without the added expense of annealing to achieve desirable HDT values. The ability to mold polyphthalamide using water heated instead of oil heated tools is most desirable due to the added cost and safety concerns associated with oil heat. The use of a TLCP expands the molding latitude of the polyphthalamide by allowing a wider mold temperature range without sacrificing key thermal properties as defined by heat deflection temperature.

EXAMPLES 12 and D

A polyphthalamide according to Example 1, except the inherent viscosity was 1.2 dl/g, was dry blended with 1 part by weight of commercial TLCP of Example 2. The blend was then injection molded on a 40 mm Battenfeld injection molding press into gears having a radius of about 1.2 cm and a control sample of the same polyphthalamide without TLCP, identified as Example D, were injection molded under similar conditions as described below.

| Nozzle Temperature | 60% of Variac |
|---|---|
| Front Zone Temperature | 321° C. |
| Middle Zone Temperature | 304° C. |
| Back Zone Temperature | 299° C. |
| Actual Mold Temperature | |
| Moving side | 123° C. |
| Stationary side | 133° C. |
| Injection Line Pressure | 70 Kg/cm$^2$ |

The molded Example D resin had a two tone appearance, a clear amorphous skin and an opaque crystalline core. In contrast the molded Example 12 resin, containing polyphthalamide and 1 percent commercial TLCP was white and homogeneous throughout.

Sample of the two resins were dried under vacuum at 110° C. and then compression molded into 5 mil thick plaques at about 335° C. at 10 tons for about 30 seconds and then transferred immediately to a cold water press to quench. A quarter inch, 5 mil thick disc was placed on a microscope slide and heated on a Kofler hot stage to remove thermal history. The sample was then transferred to a Mettler FP-52 hot stage of a depolarized light intensity apparatus (DLI) and isothermally crystallized. In this technique the resin is placed between crossed polars, and as the sample begins to crystallize it depolarized the light so the sample appears bright. The change in light intensity is recorded as a function of time. The isothermal crystallization induction times are reported in Table 6.

TABLE 6

Isothermal Crystallization Induction Times

| Temperature | Example D Induction Times, min. | 12 |
|---|---|---|
| 260° C. | .29 | .17 |
| 280° C. | .47 | .30 |
| 300° C. | 6.26 | 2.08 |

The above data demonstrates the increase in the rate of crystallization of polyphthalamide compositions containing small amounts of a TLCP.

EXAMPLE 13

Vectra A950, the commercial TLCP from Hoechst-Celanese Corporation, was thermally characterized to determine its thermal stability and its melting temperature. A 7 mg sample was run on a Perkin-Elmer TGS-II thermogravimetric analyzer under nitrogen at a rate of 10 C./minute to determine thermal stability. The melting range, mesophase range, was determine using a Omnitherm QC-25 differential scanning calorimeter. The sample is heated at a rate of 20° C./min. The catastrophic degradation of this TLCP began at about 492° C. and has roughly 59% residue at 850° C. The melting temperatures of this TLCP are 235° C. and 270° C. The temperature range over which the mesophase of this TLCP exists is bracketed by these melting temperatures while at temperatures above about 270° C., the clearing temperature of this TLCP, the order of the mesomorphic structure is lost and an isotropic melt is formed.

EXAMPLE 14

Using the procedure described in Example 13, the onset of catastrophic degradation of the polyphthalamide occurs at about 372° C.

EXAMPLE 15

A 10 mg sample of polyphthalamide similar to that prepared in Example 1, except having an inherent viscosity of 0.94 dl/g, was initially run on the Omnitherm QC-25 up through the melting peak to erase the thermal history of the samples and then quenched on an aluminum block. The sample was then transferred to a Perkin-Elmer differential scanning calorimeter 2C thermal analysis data station. The samples were heated at 20° C./min up through the melting peak, cooled at various rates (1.25, 2.5, 5, 10, 20, 40 or 80° C./min), and then reheated at 20° C./min. The temperatures of crystallization were calculated from data taken during the slow cool. Table 7 reports the data that illustrates the effect cooling rate has on the crystallization temperature (Tc) of the polyphthalamide.

TABLE 7

| Cooling Rate (°C./min) | Tc (°C.) |
|---|---|
| 80 | 215 |
| 40 | 232 |
| 20 | 243 |
| 10 | 252 |
| 5 | 253 |
| 2.5 | 258 |
| 1.25 | 261 |

Note that in the injection molding process, the cooling rate at the skin of the part is significant faster than 80° C./min resulting in a quenched skin. The core cools at a much slower rate resulting in a cooling rate gradient between skin and core. As shown in Table 7, the slower the cooling rate, the higher the temperature at which crystallization begins resulting in a higher level of crystallinity, all else similar.

What is claimed is:

1. A polymer-nucleated resinous composition comprising a crystalline polyphthalamide component consisting of (i) recurring units of terephthalamide units and (ii) one or more recurring units selected from the group consisting of isophthalamide units and adipamide units, wherein the mole ratio of (i):(ii) is at least 50 mol %; and a particulate thermotropic liquid crystalline polymer component in an amount sufficient to nucleate a melt of the polyphthalamide; wherein the polyphthalamide component has a melting temperature in a range from about a melting temperature of the thermotropic liquid crystalline polymer to a decomposition temperature of the thermotropic liquid crystalline polymer.

2. The composition of claim 1 containing about 0.01 to about 75 parts by weight of the thermotropic liquid crystalline polymer per one hundred parts by weight of the polyphthalamide component.

3. The composition of claim 1 wherein the thermotropic liquid crystalline polymer comprises in excess of 10 mole percent recurring p-oxybenzoyl moieties based on the total of recurring moieties in the thermotropic liquid crystalline polymer.

4. The composition of claim 1 wherein the polyphthalamide component comprises at least two recurring units selected from the group consisting of terephthalamide units, isophthalamide units and adipamide units and which when filled with 33 weight percent glass fibers, has a heat deflection temperature at 264 psi, according to ASTM D-648, of at least 240° C.

5. The composition of claim 4 wherein the polyphthalamide component has a melting temperature in a range from about a melting temperature of the thermotropic liquid crystalline polymer to a decomposition temperature of the thermotropic liquid crystalline polymer.

6. The composition of claim 5 containing about 0.01 to about 75 parts by weight of the thermotropic liquid crystalline polymer per one hundred parts by weight of the polyphthalamide component.

7. The composition of claim 5 wherein the thermotropic liquid crystalline polymer comprises about 10 to about 40 mole percent recurring 6-oxy-2-naphthoyl moieties and about 60 to about 90 mole percent p-oxybenzoyl moieties based on the total of recurring 6-oxy-2-naphthoyl and p-oxybenzoyl moieties in the thermotropic liquid crystalline polymer.

8. The composition of claim 5 wherein the polyphthalamide component comprises at least two recurring units selected from the group consisting of

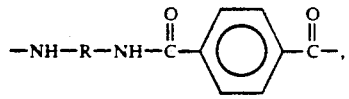

(A)

and one or more recurring units selected from the group consisting of

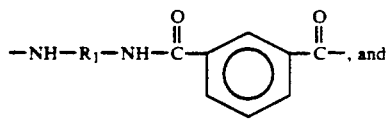

(B)

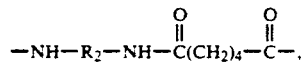

(C)

wherein R, R₁ and R₂ independently comprise a divalent straight chain or cyclic aliphatic radical which is unsubstituted or substituted with up to one methyl group per carbon atom.

9. The composition of claim 8 wherein the R, R₁ and R₂ comprise a divalent radical having the structure —(CH₂)₆—.

10. A molded article comprising the composition of claim 9.

11. The composition of claim 9 containing about 0.1 to about 40 parts by weight of the liquid crystalline polymer per one hundred parts by weight of the polyphthalamide component.

12. The composition of claim 11 wherein the mole ratio of dicarboxylic acid moieties in the units A, B and C is about 65-95:25-0:35-5.

13. The composition of claim 11 wherein the thermotropic liquid crystalline polymer comprises about 10 to about 40 mole percent recurring 6-oxy-2-naphthoyl moieties and about 60 to about 90 mole percent p-oxybenzoyl moieties based on the total of in the thermotropic liquid crystalline polymer.

14. A molded article comprising the composition of claim 1.

15. A composition comprising (i) an at least partially crystalline polyphthalamide component which when filled with 33 weight percent glass fibers, has a heat deflection temperature at 264 psi, according to ASTM D-648, of at least 240° C. and comprises recurring units

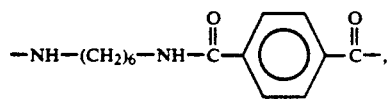

(A')

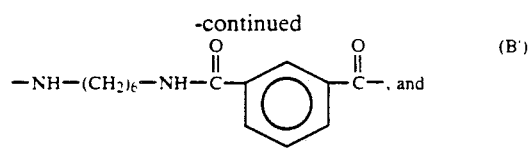

(B')

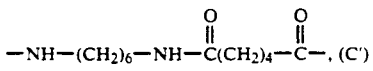

(C')

such that the mole ratio of the dicarboxylic acid moieties in the units A':B':C' is about 65-95:25-0:35-5; and (ii) about 0.01 to about 50 parts by weight of a particulate thermotropic liquid crystalline polymer component per one hundred parts by weight of the polyphthalamide component wherein the polyphthalamide component has a melting temperature in a range from about a melting temperature of the thermotropic liquid crystalline polymer to a decomposition temperature of the thermotropic liquid crystalline polymer.

16. The composition of claim 15 wherein the thermotropic liquid crystalline polymer comprises in excess of 10 mole percent recurring p-oxybenzoyl moieties based on the total of recurring moieties in the thermotropic liquid crystalline polymer.

17. The composition of claim 15 additionally comprising about 0.01 to about 2 parts by weight per hundred parts by weight of the polyphthalamide component of a heat stabilizer selected from the group consisting of potassium iodide, sodium iodide and combinations of potassium iodide and/or sodium iodide with cupric acetate.

18. The composition of claim 15 additionally comprising about 0.01 to about 5 parts by weight per hundred parts by weight of the polyphthalamide component of a mold release agent selected from the group consisting of aluminum distearate, hexamethylene bis-stearamide wax and combinations thereof.

19. The composition of claim 15 wherein the mole ratio of dicarboxylic acid moieties in the units A', B' and C' is about 65:25:10.

20. The composition of claim 19 wherein the thermotropic liquid crystalline polymer comprises about 10 to about 30 mole percent recurring 6-oxy-2-naphthoyl moieties and about 70 to about 90 mole percent p-oxybenzoyl moieties based on the total of recurring 6-oxy-2-naphthoyl and p-oxybenzoyl moieties in the thermotropic liquid crystalline polymer.

21. The composition of claim 19 additionally comprising about 0.01 to about 2 parts by weight per hundred parts by weight of the polyphthalamide component of a heat stabilizer selected from the group consisting of potassium iodide, sodium iodide and combinations of potassium iodide and/or sodium iodide with cupric acetate, and about 0.01 to about 5 parts by weight per hundred parts by weight of the polyphthalamide component of a mold release agent selected from the group consisting of aluminum distearate and hexamethylene bis-stearamide wax and combinations thereof.

22. A molded article comprising the composition of claim 15.

* * * * *